W. H. KEMLER.
PROCESS OF HYDRATING LIME.
APPLICATION FILED MAY 12, 1909.
956,977.
Patented May 3, 1910.
3 SHEETS—SHEET 1.
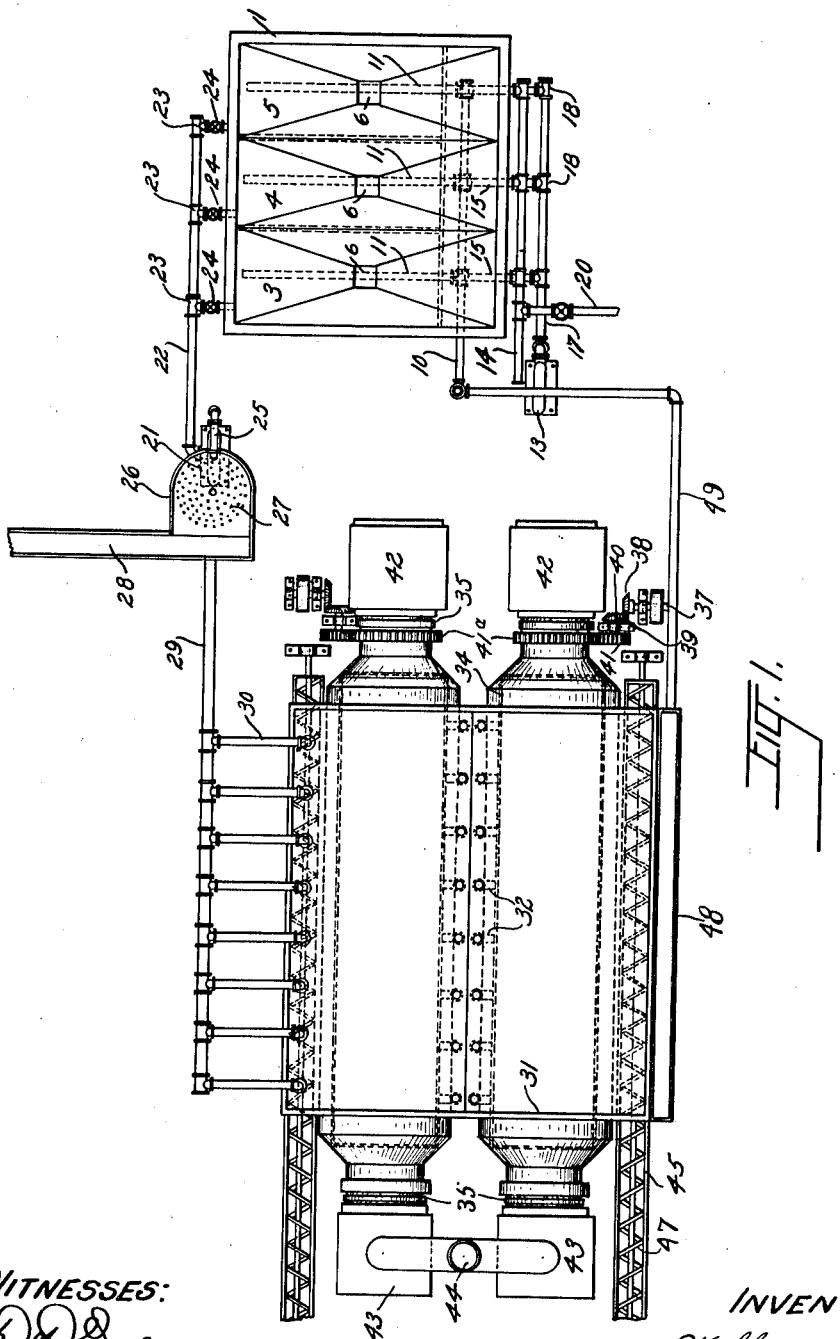
WITNESSES:
INVENTOR
William H. Kemler
BY Robert Klotz
ATTORNEY W. H. KEMLER.
PROCESS OF HYDRATING LIME.
APPLICATION FILED MAY 12, 1909.
956,977.
Patented May 3, 1910.
3 SHEETS—SHEET 2.
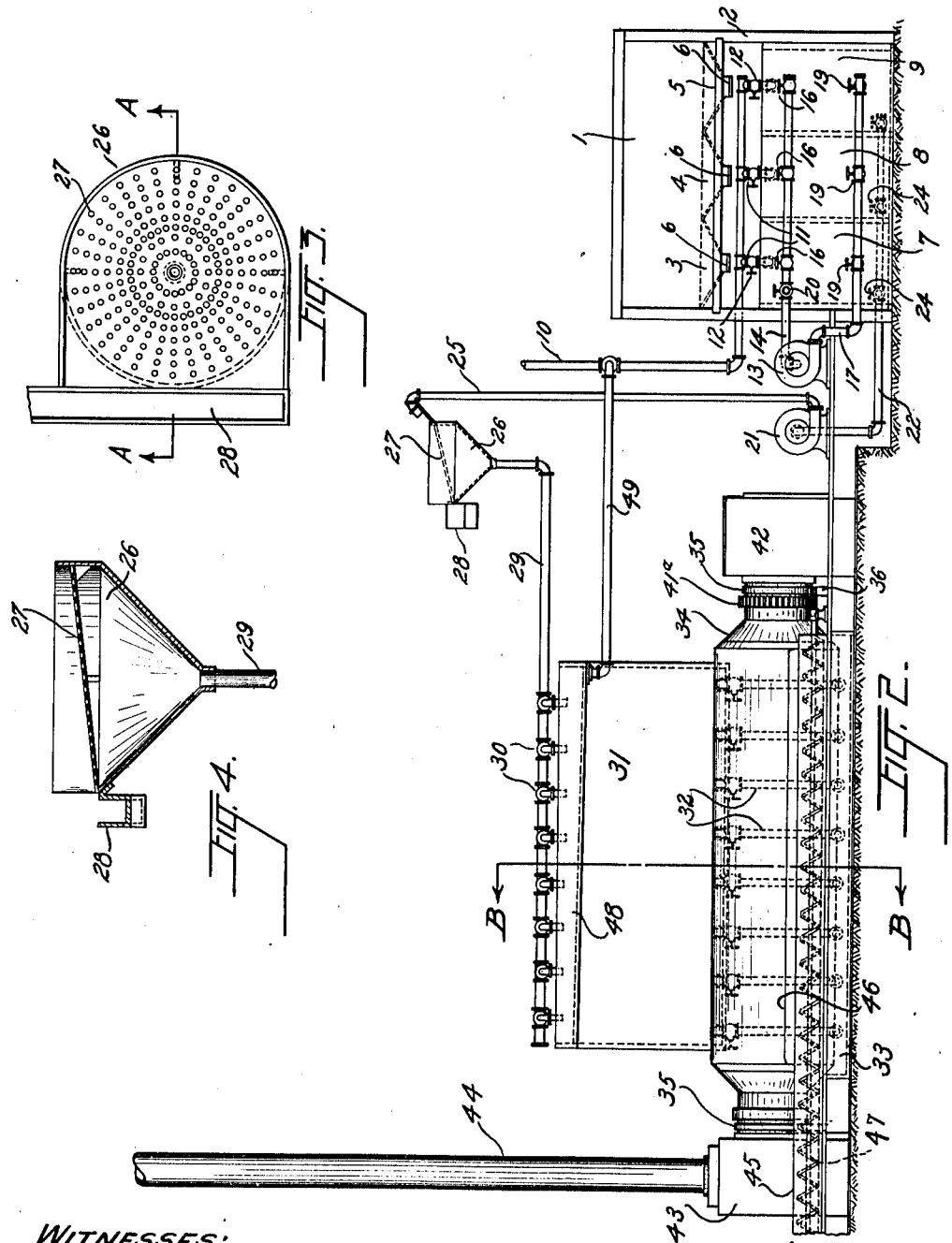
WITNESSES:
INVENTOR
BY William H. Kemler
Robert Klotz,
ATTORNEY W. H. KEMLER.
PROCESS OF HYDRATING LIME.
APPLICATION FILED MAY 12, 1909.
956,977.
Patented May 3, 1910.
3 SHEETS—SHEET 3.
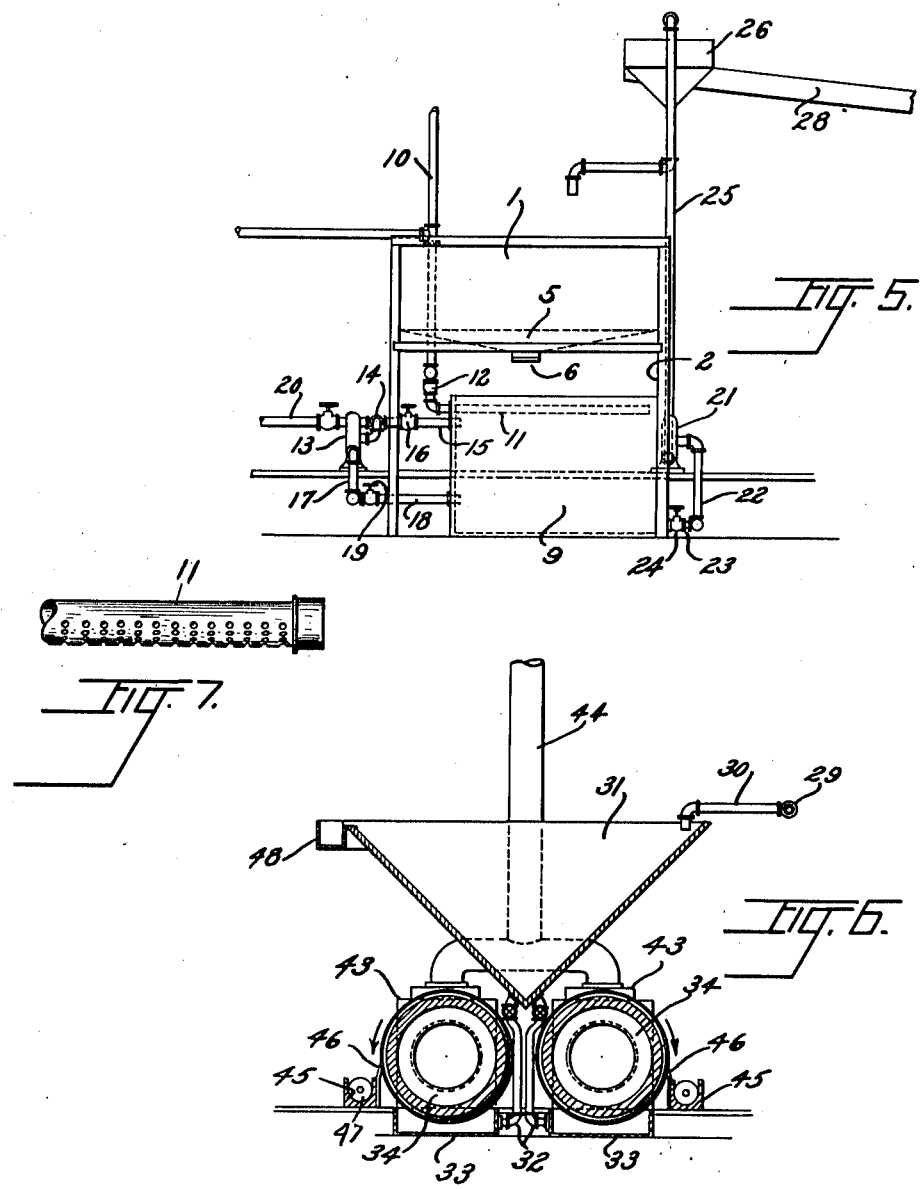

UNITED STATES PATENT OFFICE.

WILLIAM HERMAN KEMLER, OF ASHLAND, KENTUCKY.

PROCESS OF HYDRATING LIME.

956,977.  Specification of Letters Patent.  Patented May 3, 1910.

Application filed May 12, 1909. Serial No. 495,458.

*To all whom it may concern:*

Be it known that I, WILLIAM H. KEMLER, a citizen of the United States, and residing at Ashland, in the county of Boyd and State of Kentucky, have invented a new and useful Improvement in the Process of Hydrating Lime, of which the following is a complete specification.

This invention relates to improvements in the process of hydrating lime, and is designed to produce a superior quality of hydrated lime, whether from the treatment of calcareous or fat limes, or dolomitic or magnesium limes.

In the usual methods of hydrating lime by the use of mechanical devices, the freshly calcined lime, either calcareous or dolomitic, is treated with a pre-determined quantity of water which slakes or hydrates the calcined lime to a powder which remains in a dry state owing to the fact that only a sufficient quantity of water is added to chemically combine with the lime and compensate for the loss in vapor due to the heat evolved.

Owing to the fact that all lime producing rock contains silicates or metallic oxids to a greater or less degree which are not affected during the calcination of the rock, there will always be a variable quantity of uncalcined material which has no affinity for water, and an allowance must be made in slaking the lime for a theoretical amount of uncalcined matter to prevent an excess of water being added. Since the quantity of uncalcined material is variable, it is necessary that the quantity of water added be only that which will chemically combine with the calcined lime when the greatest amount of uncalcined material is present.

Previous experience in the art has demonstrated that thorough hydration of lime cannot be effected unless the lime is exposed to the action of water for a considerable length of time. In ordinary hydration or slaking of lime prior to the introduction of the modern mechanical process it has been customary to add the water to the lime and allow it to season or temper for a period of time ranging from one week to several months.

The main objects of this invention are to provide an improved process by means of which the calcined lime may be quickly and thoroughly slaked by the addition of an excess of water and agitating the mass until the particles of lime have been thoroughly broken up or separated; to provide a process in which the uncalcined material may be thoroughly separated from the mass; and to provide a process adapted to quickly and thoroughly drive off the excess of water from the slaked lime by the application of the lime to a heated surface.

A specific construction for carrying out said invention is illustrated in the accompanying drawings, in which:

Figure 1 is a plan view of the slaking and drying mechanism employed in carrying out this invention. Fig. 2 is a side elevation of the same. Fig. 3 is a plan view of the separating screen. Fig. 4 is a section taken on line A—A of Fig. 3. Fig. 5 is an end elevation of the slaking and agitating means. Fig. 6 is a section taken on line B—B of Fig. 2. Fig. 7 is an enlarged fragmentary view of one of the sprinkling nozzles for the hydrating tanks.

In the construction shown in said drawings, a storage bin 1 is supported upon a suitable frame 2 and is adapted to contain the calcined lime. The bottom of said bin is preferably provided with a plurality of funnel shaped sections 3, 4 and 5, to permit the lime to flow therefrom by gravity, and each section is provided with a gate 6 at its bottom through which the lime may be discharged into the hydrating or slaking tanks 7, 8 and 9. Said tanks are situated one below each of said bin gates, and a water supply pipe 10 leads from any suitable source of water supply and is provided with a plurality of spraying branches or nozzles 11, one of which is situated in the upper portion of each of said tanks and is adapted to spray water over the contents thereof. Each of said nozzles is provided with a valve 12 by means of which the flow of water to each of said tanks is controlled. A centrifugal pump 13 is located near said tanks and is provided with a suction pipe 14, which has branches 15 extending into and located near the tops of said tanks, and each of which is provided with a valve 16. A discharge pipe 17 leads from said pump and is provided with branches 18 which lead into the lower portions of said tanks and each branch is provided with a valve 19 by means of which communication with the tank into which the branch extends may be controlled.

A valved water supply pipe 20 leads from the source of water supply and is connected in the suction pipe 14 intermediate the pump and the branches 15, and after the lime in the tanks has been sprayed sufficiently to effect a preliminary slaking of the same, water is pumped from the supply pipe 20 and discharged into one or more of the tanks through the branches 18, until the branches 15 are submerged. The supply from the pipe 20 is then shut off and the valves 16 in the branches 15 are opened and the milk of lime formed by the water and finely divided lime is pumped from the upper portions of the tanks and discharged back into the lower portions thereof until the mass has become thoroughly agitated and mixed and all of the calcined portions broken up.

A pump 21 is located near said tanks and is provided with a suction pipe 22 which has branches 23, each opening into the bottom of one of the tanks and provided with a valve 24. A discharge pipe 25 leads from the outlet of said pump 21 and discharges into an elevated screen 26 into which the milk of lime is delivered from the tanks after it has been thoroughly agitated. Said screen is provided with an inclined sieve 27 adapted to separate the uncalcined material from the milk of lime. Said material is gradually washed down to the lower edge of the sieve and deposited into a trough 28 at the side of said screen which is adapted to carry said material off to any desired place of deposit.

A pipe leads downwardly and laterally from said screen and is provided with a plurality of branches 30 which open into the top of a settling box 31. Said settling box may be supported in any desired manner, and it is preferably in the shape of a V shaped trough having closed ends and open at the top, so that when the finely divided lime or pulp settles it will not spread over a large surface and may be easily drawn off from the box. Extending downwardly from each side of the box and near the bottom thereof are the valved pipes 32 through which the thickened pulp may be drawn off into pans 33, which are located beneath the box and at each side of the center thereof.

A pair of rotary drying cylinders or drums 34 are supported one above each pan and project slightly into the same. Said cylinders may be supported in any preferred manner, but, as shown, they are provided at their ends with bearing surfaces 35 which rest on bearing surfaces 36. A drive shaft 37 is journaled adjacent one end of each cylinder and is provided with a beveled gear 38 which meshes with a beveled gear 39 on a shaft 40, and the shaft 40 is provided with a pinion 41 which meshes with the gear 41ª on the cylinder and acts to rotate the cylinder in the direction indicated by the arrows in Fig. 6. At one end of each cylinder is a furnace 42 into which the cylinder opens and acts as a flue to carry off the heat and products of combustion from the furnace.

At the opposite end of each cylinder is a hollow chimney base or foundation 43 into which said cylinder opens, and leading upwardly therefrom is the stack or chimney 44. At the side of each cylinder is a conveyer trough 45, which extends longitudinally of the cylinder and is provided with a blade or scraper 46, the upper edge of which lies in close contact with the side of the cylinder. In each conveyer trough 45 is a worm conveyer 47, which may be driven in any suitable manner, not shown, and is adapted to carry material away from said cylinders.

In order to provide a uniform flow across the settling box 31 a trough 48 is provided at the top of said box, and extends longitudinally thereof, and is adapted to receive the overflow of water from the box. A pipe 49 leads from said trough and connects in the supply pipe 10, so that the overflow may be again used in the hydrating tanks.

The operation of the construction shown is as follows: The calcined lime is admitted to the various hydrating tanks from the storage bin 1 by means of the various bin gates 6. The hydrating tanks are preferably operated in succession to provide a continuous operation. That is, while one tank is being filled and agitated, the contents of a second is allowed to temper, and that of a third is being drawn off, thus providing a continuous operation. When the calcined lime is placed in one of the tanks, a sufficient quantity of water is admitted through the spraying branch or nozzle 11 for that tank to spray the lime and effect a preliminary slaking or breaking up of the lime. The valve 12 is then closed and water is admitted to the tank from the supply pipe 20 and through the branch 18 of the discharge pipe until the branch 15 of the suction pipe 14 is submerged. The water is then pumped from the top of the tank to the bottom thereof until the lime has become thoroughly broken up and mixed with the water. The water with the lime in suspension is then drawn off by means of the pump 21 and deposited in the screen 26 where all of the uncalcined material is separated out. The milk of lime then flows from the screen to the settling box 31 and is distributed throughout the length of said box by means of the branch pipes 30. The finely divided lime settles to the bottom of said box and the water flows into the trough 48, when the box becomes filled, and back to the supply pipe 10. The settled lime pulp is then drawn from the bottom of the box into the pans 33 to a sufficient depth to submerge the bottoms of the cylinders. The cylinders are highly heated by means of the heat from the furnaces passing therethrough, and as they slowly revolve the lime adheres thereto and the water is evaporated by the heat. By the time the adhering lime reaches the scrapers 46 it has become thoroughly dried and is scraped off into the conveyer troughs and carried away by the conveyers. The flow of the lime pulp from the settling box into the pans may be regulated by means of the valves in the pipes 32, so that the level in said pans may remain constant.

While but one specific method for carrying out the invention has been shown and described it will be understood that various details of the process may be changed or omitted without departing from the spirit of this invention.

I claim as my invention:

1. The process of hydrating lime comprising, slaking the calcined lime in a suitable receptacle, adding an excess of water thereto, agitating the mass by rapidly pumping it from the top of the receptacle back into the bottom of the receptacle, separating out the uncalcined material, settling the lime pulp and then applying the pulp to a revolving heated cylinder to drive off the excess moisture.

2. The process of hydrating lime comprising placing the calcined lime in a receptacle and adding enough water to slake or break up the lime, adding an excess of water and rapidly pumping the mass from the top of the receptacle back into the bottom of the receptacle to throw the lime upwardly in the receptacle, running the mass through a screen to separate out the uncalcined material, settling the lime pulp in a settling tank, applying the pulp to a revolving heated cylinder, and scraping the dried residue therefrom.

3. The process of hydrating lime comprising, slaking the calcined lime in a suitable receptacle, adding an excess of water and agitating the mass from the bottom of the receptacle upwardly, running the mass through a screen, separating the lime pulp from the water, then placing the pulp on a revolving cylinder to drive off the excess moisture.

In testimony whereof I have hereunto subscribed my name in the presence of two witnesses.

WILLIAM HERMAN KEMLER.

Witnesses:
GERALD L. HAGLER,
ANNA MYERS.